United States Patent

Yokota et al.

[11] 3,909,694
[45] Sept. 30, 1975

[54] CONTROL CIRCUIT FOR A CONDENSER DISCHARGE TYPE WELDER

[75] Inventors: Hiroshi Yokota, Hugisawa; Humimasa Machida, Kawasaki, both of Japan

[73] Assignee: Tokyo Shibaura Electric Co., Ltd., Japan

[22] Filed: Mar. 13, 1974

[21] Appl. No.: 450,748

[30] Foreign Application Priority Data
Mar. 16, 1973 Japan.............................. 48-30635
Mar. 16, 1973 Japan.............................. 48-30636
Mar. 16, 1973 Japan.............................. 48-30637

[52] U.S. Cl...................................... 320/1; 219/98
[51] Int. Cl.²..................... B23K 11/26; H02M 9/06
[58] Field of Search............ 320/1; 219/98; 307/108

[56] References Cited
UNITED STATES PATENTS
3,171,011 2/1965 English .................................. 320/1
3,262,043 7/1966 Heinrich ................................ 320/1

*Primary Examiner*—Stuart N. Hecker
*Attorney, Agent, or Firm*—Oblon, Fisher, Spivak, McClelland & Maier

[57] ABSTRACT

A control circuit for a condenser discharge type welder comprises a switching element connected in a discharge path of the condenser and driving means for turning on the switching element thereby allowing a discharge for welding. The driving means and the discharge path have a commonly used portion which prohibits discharge when the discharge path is not adequately made.

3 Claims, 1 Drawing Figure

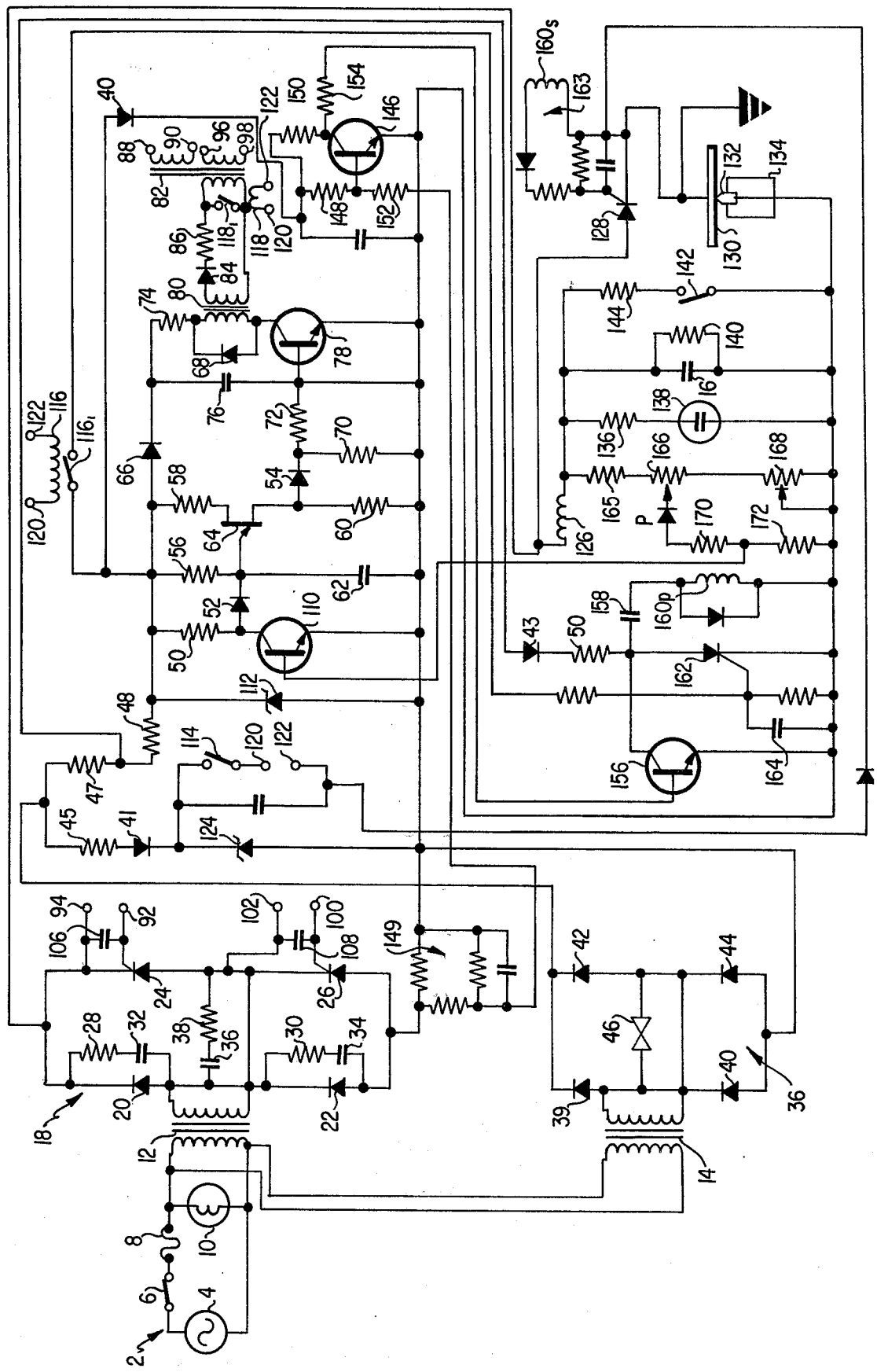

CONTROL CIRCUIT FOR A CONDENSER DISCHARGE TYPE WELDER

BACKGROUND OF THE INVENTION

1. Field of the Invention

The present invention relates to a control circuit for a condenser discharge type welder especially used for welding a stud using a contact type percussion welding method.

2. Description of the Prior Art

Conventionally, a condenser discharge type welder comprises a large capacity condenser which is charged through a charging circuit and is discharged through a welding portion to thereby accomplish a welding operation.

Discharge for welding is made by turning on a switch which triggers a discharge of the condenser. In such a conventional welder, it is possible to cause a discharge by the erroneous mistouch of a welding switch by an operator. Such an unexpected discharge is very dangerous and can cause an electric shock when the operator touches a welding electrode or a welding gun. Such an electric shock can be particularly dangerous when the operator is located at a very high place, such as in the constructing of a large ship or the building of a high structure. Under such circumstances even a small electric shock, a misdischarge having a loud noise, a spark or a reaction are very dangerous in that the operator could be scared into falling.

Another problem in the prior art is that discharge in the midst of charging caused an inadequate welding because of insufficiency in the amount of discharge. Thus, it is desirable to have a control circuit which restrains discharge while the condenser is charging even if the welding switch is turned on. This could only be accomplished in the conventional welder with a complicated circuit in order to restrain the operation of the charging circuit, since a current source would be short-circuited through a welding material when both the charging and discharging circuits operated simultaneously.

SUMMARY OF THE INVENTION

Accordingly, it is one object of the present invention to provide a new and improved control circuit for a condenser discharge type welder which is capable of preventing an erroneous discharge from happening when the welding electrode does not make contact with a material which is to be welded.

Still another object of the present invention is to provide a new and improved control circuit for a condenser discharge type welder which is capable of restraining discharge in the midst of charging.

A still further object of this invention is to prevent the working or operation of the charging circuit while a discharge or welding is being accomplished.

Briefly, in accordance with this invention, the foregoing and other objects are attained by the provision of a large capacity condenser, a circuit for charging the condenser, a switching element connected in a discharge path of the condenser, a discharge start switch and a driving circuit which drives the switching element along with operation of the discharge start switch and has a common electric path with the discharge path.

BRIEF DESCRIPTION OF THE DRAWING

A more complete appreciation of the invention will be readily obtained as the same becomes better understood by reference to the following detailed description when considered in connection with the accompanying solitary drawing, wherein:

The FIGURE is a circuit diagram of one preferred embodiment of the control circuit for the condenser discharge type welder according to the present invention.

DETAILED DESCRIPTION OF THE PREFERRED EMBODIMENT

Referring now to the drawing, a control circuit for a condenser discharge type welder which welds studs using a contact type percussion welding method according to the present invention is shown. An A.C. source circuit 2 comprises an A.C. source 4, a main power switch 6, a fuse 8, a pilot lamp 10, a first transformer 12 and a second transformer 14. A large capacity condenser 16 is charged through a first full wave rectifying circuit 18 which comprises two diodes 20, 22 and two thyristors 24 and 26. The full wave rectifying circuit 18 is provided with resistances 28, 30 and condensers 32, 34 connected parallel to the diodes 20 and 22 for providing a stable operation. A condenser 36 and a resistance 38 connected as is shown in the drawing are provided for absorbing surge voltage to protect the thyristors 24 and 26.

A second full wave rectifying circuit 36 comprises four diodes 39, 40, 42 and 44 and its D.C. output is used as the D.C. source of a control circuit. A symmetrical varistor 46 is disposed as is disclosed in the FIGURE to absorb surge voltage caused by turn-on of the power switch 6.

A D.C. voltage for the control circuit is supplied through diodes 39, 40, and 42 and resistances 45, 47, 48 and 50. An oscillating circuit of the control circuit comprises diodes 52, 54, resistances 56, 58, 60, a capacitor 62 and a uni-junction transistor 64. The output of the oscillating circuit is amplified by an amplifying circuit which comprises diodes 66, 68, resistances 70, 72, 74, a capacitance 76, a transistor 78 and a pulse transformer 80. The output of the pulse transformer 80 appears at another pulse transformer 82 through a diode 84 and a resistance 86.

Terminals 88, 90 of one secondary winding of the pulse transformer 82 are connected to gating circuit terminals 92, 94 of the thyristor 24 respectively. Terminals 96, 98 of the other secondary winding of the pulse transformer 82 are connected to gating circuit terminals 100 and 102 of the thyristor 26 respectively. Condensers 106, 108 are connected between the terminals of the gating circuits respectively as is shown in the FIGURE in order to absorb any noise signal.

A transistor 110 is operated by an output voltage derived from a variable resistor 166. A Zener diode 112 is disposed in parallel to the control circuit to enable a prescribed voltage to be obtained for the uni-junction transistor 64.

A discharge start switch 114 is connected to relay coils 116, 118 through common terminals 120, 122. Thus, in accordance with a current application, switches 116$_1$, and 118$_1$, are closed. A Zener diode 124 is disposed parallel to the relays 116 and 118 to give a prescribed voltage therefor.

A charge stored at the condenser 16 is discharged through a reactor 126, a thyristor 128, a plate or the like 130 on which a stud 132, i.e. a screw or a bolt, attached at a top of a welding gun electrode 134 is welded. The plate 130 is connected to ground. The reactor 126 is inserted to protect the thyristor 128 from breakdown with an instantaneous application of the discharge current. A resistor 136 and an Ne tube 138 are inserted to give a signal indicating a charged situation. A resistor 140 is inserted parallel to the large capacity condenser 16 and allows a minute discharge to maintain a prescribed voltage level of the condenser. Since a minute leakage current will flow to increase the voltage level of the condenser 16 even if the thyristors 24 and 26 are off it is desirable to provide the minute discharge means. A switch 142 and a resistor 144 are connected in parallel to the condenser 16 to provide another discharge connection. The switch 142 is attached to the main power source switch 6 and operates with an opposite movement, i.e., when the main switch 6 is closed the switch 142 is open. When the main switch 6 is set to open, the switch 140 is closed to thereby provide a discharge loop for extinguishing any unnecessary charge and for thereby assuring safety.

A switching circuit which comprises a switching transistor 146 and four resistors 148, 150, 152 and 154 is controlled by a voltage derived at a load 149 which comprises two resistors for dividing a voltage and a smoothing condenser. The switching transistor 146 is kept off while the condenser 16 is charged because of the D.C. voltage applied through the load 149. A transistor 156 which is controlled by the switching transistor 146 is kept on while the condenser 16 is charged. A condenser 158 is charged by the D.C. source 36 and is discharged to operate a primary winding 160p with turn-on of a thyristor 162 which is triggered by the charge of a condenser 164. With the excitement of the primary winding 160p, a secondary winding 160s of a gating circuit 163 is operated to turn on the thyristor 128.

The series connection of a resistor 165, a variable resistor 166 and a semi-variable resistor 168 is connected in parallel to the condenser 16 to divide the charged voltage of the condenser 16. The semi-variable resistor 168 is set to limit the maximum voltage to be stored at the condenser 16 and the variable resistor 166 is used to obtain an appropriate voltage within the desired range. Resistors 170 and 172 are used to divide the voltage obtained at the variable resistor 166 for obtaining an appropriate base voltage for the transistor 110.

Operation of the circuit described is explained hereinbelow. A slide terminal of the variable resistor 166 is set to give an appropriate voltage to the condenser 16. The transistor 110 is not given enough voltage to be on, and the condenser 62 is charged to oscillate the uni-junction transistor 64. The oscillation signal is amplified by the transistor 78 and is transferred to the pulse transformers 80 and 82. The gate circuits of the thyristors 24, 26 are given enough signal to turn on the thyristors 24 and 26 through the pulse transformer 82 and the condenser 16 is charged.

With increase of a charge of the condenser 16, generation of pulses at the uni-junction transistor 64 is delayed and the thyristors are not given a gating pulse to turn on and thus the condenser 16 stops being charged. The charge stored at the condenser 16 is checked constantly by the transistor 110 through the variable resistor 166 to control the uni-junction transistor 64, so that the charge is kept constant. In the midst of charging, the transistor 146 is controlled to be off by a base voltage applied through the load 149. When the transistor 146 is off, the transistor 156 is on and there is no current flow through the coil 160p. Thus, the gating circuit 163 does not work even if a discharge start switch 114 is closed.

When charging of the condenser 16 is over and preparation made for welding is over, the discharge start switch 114 is closed. Along with turning on of the switch 114 a closed loop through welding gun 134 is completed only when the screw 132 and plate 130 are in contact to excite relay coils 116 and 118 and thereby close switches $116_1$, and $118_1$. When the switch $118_1$, is on, pulse signals are not transfered to the pulse transformer 82. Thus thyristors 24, 26 are turned off to terminate the charging function.

When the switch $116_1$, is turned on, the condenser 164 is charged to turn on the thyristor 162 thereby permitting the flow of a charge stored at the condenser 158 exciting primary winding 160p. Turn-on of the thyristor 162 is commenced somewhat later than turn-off of the thyristors 24, 26 because it takes time to get enough voltage to turn on the thyristor 162. Thus, at this moment, there is no charging current flow and the transistor 146 is on and the transistor 156 is off.

With excitement of the primary winding 160p, the secondary winding 160s is excited to turn on the thyristor 128 to provide a discharge loop through the welding gun 134.

As described above, the thyristor 128 is not turned on until charging of the condenser 16 is over and the screw 132 and the plate 130 are contacted with each other, even if an operator accidently closed the discharge start switch 114, since the discharge path through the welding gun electrode 134 and the control circuit for driving the relay coil 116, which turns on the thyristor 128, are common in part.

Thus the embodiment of the present invention has an advantage in that an electric shock or spark does not occur in the event of an accidental operation, and also an advantage in that welding under insufficient charging voltage never occurs since the charging condition is always checked to prevent effective working of the discharge start switch until charging is over.

Also when the discharge start switch is closed, the charging circuit is first closed before the thyristor of the discharge circuit begins to operate and thus the charging circuit and the discharge circuit will never work together. Thus, the charging source is protected from causing a short circuit which would damage the power source.

Obviously, numerous modifications and variations of the present invention are possible in light of the above teachings. For example, while thyristors are used as an example of a switching element, they may be easily replaced with other switching elements having similar functions.

It is therefore to be understood that within the scope of the appended claims, the invention may be practiced otherwise than as specifically described herein.

What is claimed as new and desired to be secured by Letters Patent of the United States is:

1. A control circuit for a condenser discharge type welder comprising:
  a large capacity condenser having a charging path and a discharge path;
  means for charging said condenser;

a first switching element connected in said discharge path of said condenser;

a second switching element connected in said charging path of said condenser;

a discharge start switch;

means for controlling said second switching element to terminate charging along with operation of said discharge start switch; and a driving circuit for turning on said first switching element to start discharging after charging is terminated; and said driving circuit having a common electric path with said discharge path to prevent discharge even when said discharge start switch is closed whenever the welder is not in contact with the material to be welded.

2. A control circuit for a condenser discharge type welder comprising:

a large capacity condenser having a discharge path;

means for charging said condenser;

means for checking the charged condition of said condenser;

a switching element connected in said discharge path of said condenser;

a discharge start switch;

a driving circuit for turning on said switching element along with operation of said discharge start switch;

said driving circuit having a common electric path with said discharge path to prevent discharge even when said discharge start switch is closed whenever the welder is not in contact with the material to be welded; and means for restraining operation of said switching element during the charging of said condenser.

3. A control circuit for a condenser discharge type welder comprising:

a large capacity condenser having a charging path and a discharge path;

means for charging said condenser;

means for checking the charged condition of said condenser;

a first switching element connected in said discharge path of said condenser;

a second switching element connected in said charging path of said condenser;

a discharge start switch;

means for controlling said second switching element to terminate charging along with operation of said discharge start switch;

a driving circuit for turning on said first switching element to start discharging after charging is terminated;

said driving circuit having a common electric path with said discharge path to prevent discharge even when said discharge start switch is closed whenever the welder is not in contact with the material to be welded; and means for restraining turning on of said first switching element during the charging of said condenser.

\* \* \* \* \*